United States Patent [19]

Jenekhe et al.

[11] Patent Number: 4,945,156
[45] Date of Patent: Jul. 31, 1990

[54] SOLUTION PROCESSING OF RIGID CHAIN AND LADDER POLYMERS

[75] Inventors: Samson A. Jenekhe, Rochester, N.Y.; James R. Peterson, St. Paul, Minn.

[73] Assignee: Honeywell Inc., Minneapolis, Minn.

[21] Appl. No.: 291,792

[22] Filed: Dec. 29, 1988

[51] Int. Cl.$^5$ .................. C08J 3/02; C08G 73/18; C08G 73/22

[52] U.S. Cl. .................. 528/485; 264/211.16; 264/211.19; 264/216; 264/340; 528/342; 528/350; 528/490; 524/600

[58] Field of Search .................. 524/600; 252/500; 528/481, 485, 490, 350, 342; 525/434, 435, 436

[56] References Cited

U.S. PATENT DOCUMENTS

| | | | |
|---|---|---|---|
| 3,574,171 | 4/1971 | Chenevey et al. | 528/490 X |
| 3,600,350 | 8/1971 | Kwolek et al. | |
| 3,701,764 | 10/1972 | Hargitay | 528/490 X |
| 3,819,587 | 6/1974 | Kwolek et al. | |
| 4,548,737 | 10/1985 | Ballard et al. | 528/490 X |
| 4,548,738 | 10/1985 | Jenekhe et al. | 528/490 X |
| 4,568,482 | 2/1986 | Jenekhe et al. | |

FOREIGN PATENT DOCUMENTS

210635 10/1985 Japan .................. 528/485

OTHER PUBLICATIONS

Journal of Applied Polymer Science, vol. 15, pp. 2035–2047, Arnold, et al., "Unusual Film–Forming Properties of Aromatic Heterocyclic Ladder Polymers", 1971.

Accounts of Chemical Research 19, "Conducting Polymer Solutions", Jane E. Frommer, pp. 2–9, 1986.

Journal of Polymer Science: Polymer Physics Edition, vol. 14, "The Viscosity of Concentrated Solutions of a Heterocyclic Polymer", p. 1717, 1976.

*Primary Examiner*—Earl Nielsen
*Attorney, Agent, or Firm*—Gregory A. Bruns

[57] ABSTRACT

Methods of solution processing of rigid chain and ladder polymers to films, coatings, or fibers from isotropic or anisotropic solutions in aprotic organic solvents containing Lewis acids are disclosed.

26 Claims, 3 Drawing Sheets

SOLUTION PROCESSING OF RIGID CHAIN AND LADDER POLYMERS

The Government has rights in this invention, pursuant to a contract awarded by the Department of the Air Force.

CROSS-REFERENCE TO RELATED APPLICATIONS

Reference is made to applications Ser. No. 07/291,815 entitled "ORGANIC SOLVENT SYSTEMS FOR SOLUBILIZING POLYMERS" and application Ser. No. 07/291,924 entitled "COMPLEXATION-MEDIATED SOLUBILIZATION OF POLYMERS" both filed of even date and assigned to the same assignee as the present application. The inventions of those applications address unique but related subject matter.

BACKGROUND OF THE INVENTION

1. Field of the Invention

The present invention relates generally to solution processing of organic polymers to useful forms as films, coatings, or fibers and, more particularly, to the solution processing of rigid chain and ladder polymers in aprotic organic solvents.

2. Related Art

Numerous rigid chain or ladder polymers have been synthesized in the past few decades and shown to exhibit exceptional high temperature stability, very high mechanical strength, resistance to solvents, and generally excellent environmental stability. Polymeric materials with these properties are of technological interest for diverse applications, including as structural materials in engineering structures and aerospace vehicles, as dielectric materials in electronics, as engine components, and as heat-resistant coatings.

Rigid chain polymers are exemplified by poly(p-phenylene-2,6-benzoxazole) (PBO), of the structure

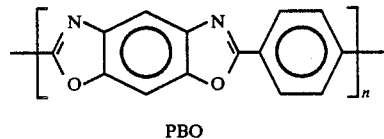

PBO (I)

poly (p-phenylene-2,6-benzothiazole) (PBT), of the structure

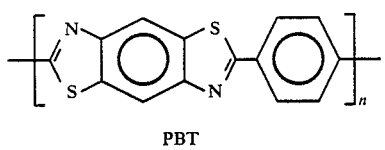

PBT (II)

poly(p-phenylene-2,6-benzimidazole) (PBI), of the structure

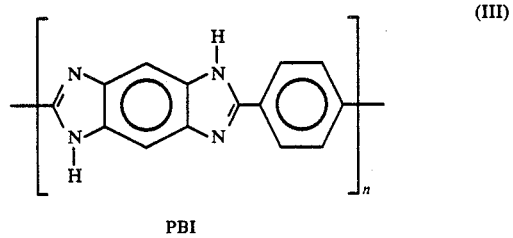

PBI (III)

and the so-called ladder structures, for example, by benzimidazobenzo-phenanthroline-type ladder polymer (BBL) and derivatives, five of whose structures are also shown below.

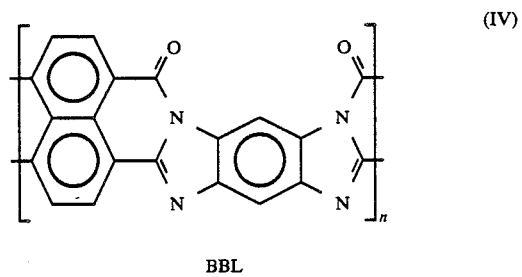

BBL (IV)

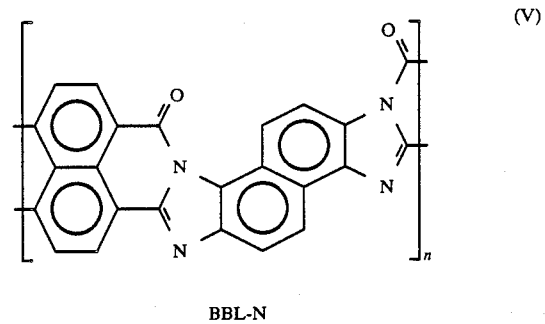

BBL-N (V)

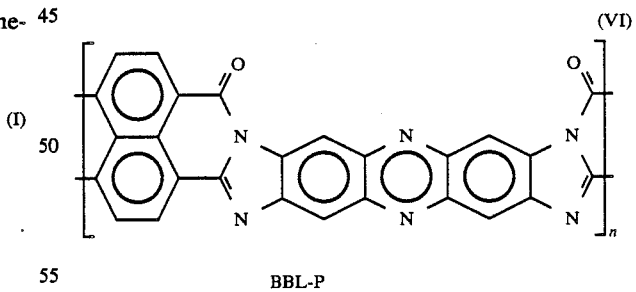

BBL-P (VI)

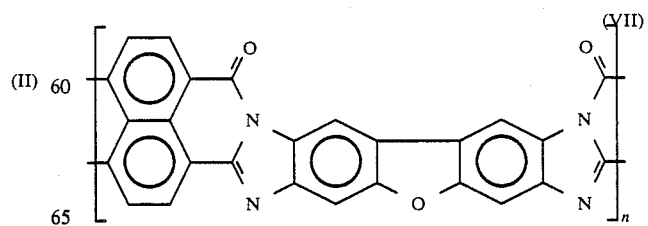

BBL-DBF (VII)

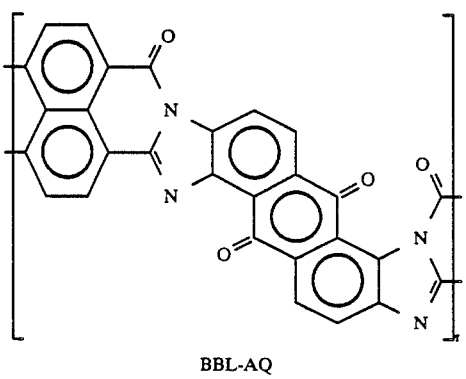

BBL-AQ

Other examples of ladder polymers include the polyhydroquinoxaline ladder structure,

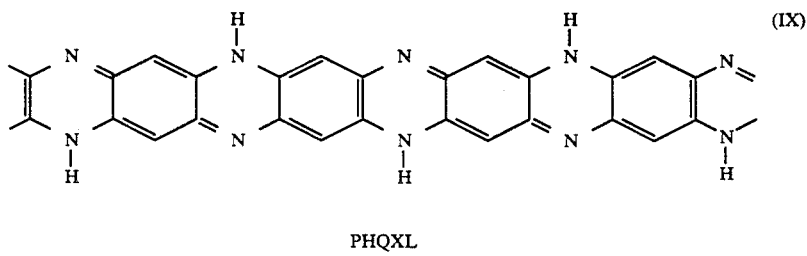

PHQXL whose oligomeric model compound 5,12-dihydro-5,7, 12, 14-tetraazapentacene (DHTAP) has the structure

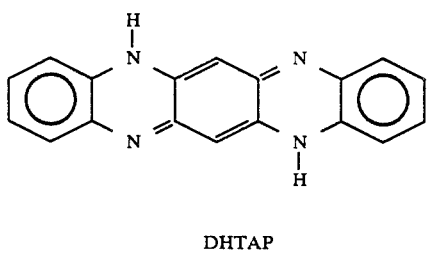

DHTAP

The semi-ladder polybenzimidazobenzophenanthroline (BBB) of structure,

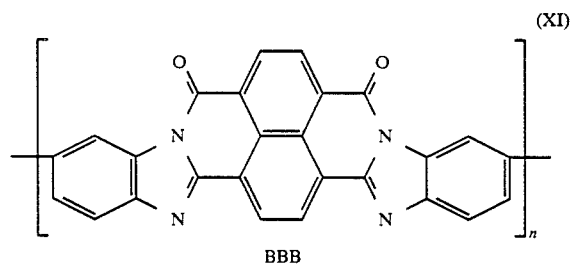

BBB and its oligomeric model compound cis - BB of the structure,

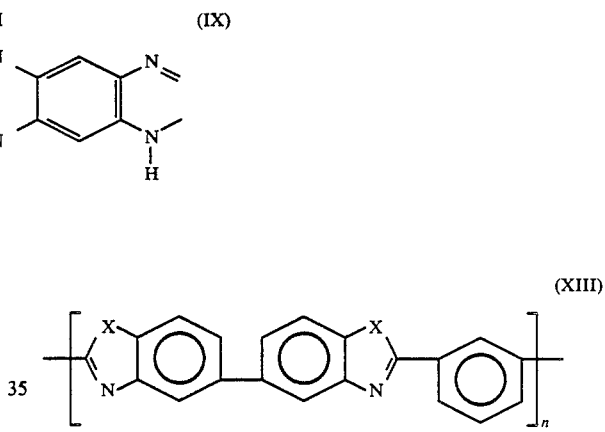

CIS-BB also exemplify the rigid chain and thermally stable polymers in structural and physical properties. Other notable polymers in this regard include the non-fused polybenzimidazole (X=N—H) and derivatives with the structure,

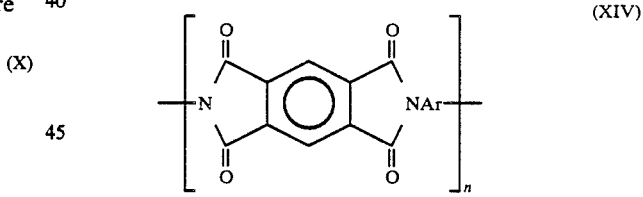

and the aromatic polyimides of the structure

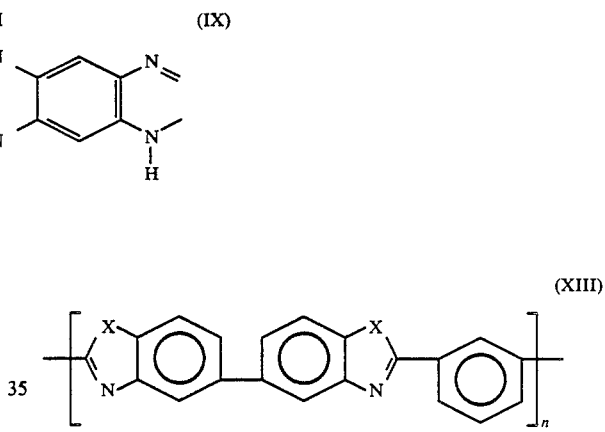

such as poly [N,N'-bis(phenoxyphenyl)pyrromellitimide) or Kapton (Trademark of the duPont Co).

More recently, these rigid chain or ladder polymers, such as exemplified in structures I to XIV, have shown useful electronic and optical properties in addition to their excellent thermal stability and mechanical properties and thus are of further technological interest as novel materials for electronic, electro-optic, and optical applications.

However, these rigid chain and ladder polymers and even those modified with pendant groups, have generally been insoluble in aprotic organic solvents from which their solutions could be processed by standard polymer film, coating or fiber processing techniques. Furthermore, their melting points are generally above their decomposition temperatures which are well in excess of 400–600° C. The general insolubility of these types of polymers in organic solvents can be attributed to two main factors inherent in their molecular architecture: (a) intramolecular or conformational effects, particularly the rigidity of the polymer chains; and (b)

intermolecular effects, especially strong interchain interactions.

Heretofore, strong and corrosive concentrated acids, such as methanesulfonic acid (MSA), triflic acid (CF$_3$SO$_3$H), and sulfuric acid, are solvents which have been used to characterize their properties and process them into films or fibers. The observed solubility of these polymers in strong protic acids is generally thought to originate from protonation of the polymer chains to form polyelectrolytes, such as shown below for BBL,

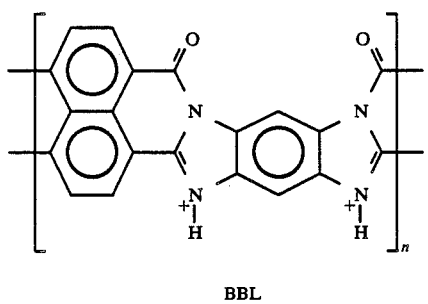

BBL (XV)

with consequent significant reduction of the intermolecular attractions and the rigidity of the chain. The major disadvantages of using these strong acid solutions for large-scale production of films and fibers of these rigid chain and ladder polymers include the highly corrosive and toxic nature of the solvents; in addition, the acids are not volatile and are generally difficult to remove from the polymer films or fibers.

In the related art, processing of rigid chain para-linked aromatic polyamides such as poly(1,4-benzamide) (PBA),

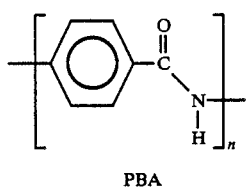

PBA (XVI)

and poly(1,4-phenyleneterephthalamide) (PPTA) or Kevlar (Trademark of the E. I. duPont Co.),

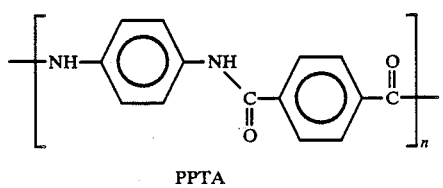

PPTA (XVII)

to fibers and films is achieved by their successful solubilization in a binary solvent system consisting of LiCl or CaCl$_2$ dissolved in amide solvents such as N,N-dimethylformamide (DMF), N,N-dimethylacetamide (DMAc) and N-methylpyrrolidone (NMP).

Typically, PBA, PPTA or related rod-like aromatic polyamides can be dissolved in the aprotic organic solvents (DMF, DMAC, NMP) containing 3–15% wt LiCl or CaCl$_2$. At sufficiently high PBA or PPTA concentrations in LiCl/amide or CaCl$_2$ amide solvents, liquid-crystalline solutions can be obtained. Such liquid-crystalline polymer solutions are used to prepare high-strength, high-modulus oriented fibers as disclosed by S. L. Kwolek, et al (U.S. Pat. Nos. 3,600,350 and 3,819,587, and Macromolecules 10, 1390–1396, 1977). However, these salt/amide solvent systems, such as LiCl/DMF, LiCl/DMAc, LiCl/NMP, etc. do not solubilize the class of rigid chain thermally stable polymers exemplified by the polymer structures I to XIV.

Some researchers have reported successful solubilization of certain rigid chain, conjugated, or ladder polymers in pure Lewis acids in the molten or liquid state. One of the present inventors, S. A. Jenekhe, and his co-workers have disclosed the successful solubilization of polycarbazoles of the structure,

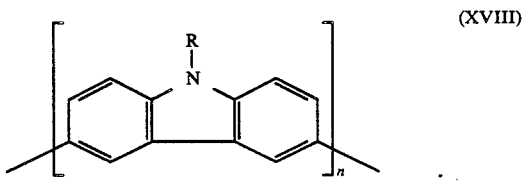

(XVIII)

in molten iodine (m.p.=106° C.), resulting in conducting polymer solutions from which doped conducting films of polycarbazoles can be obtained (Jenekhe et al, U.S. Pat. No. 4,568,482 of common assignment with the present invention) and Molecular Crystals and Liquid Crystals 105, 175, 1984). The solubilization of poly(p-phenylene sulfide) (PPS) of the structure,

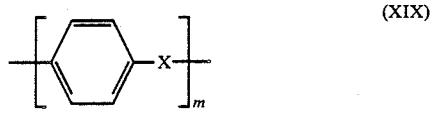

(XIX)

where X=S, in liquid AsF$_3$/AsF$_5$ to produce conducting solutions from which conducting films of PPS can be obtained has been reported by Frommer (J. E. Frommer, Accounts of Chemical Research 19, 2–9, 1986).

The solubilization of a rigid chain polymer, polybis-benzimidazobenzophenathroline-dione (BBB), of the structure XII, in molten antimony trichloride (SbCl$_3$) (m.p.=73° C.) has been reported by Berry et al (G. C. Berry and S. M. Liwak, J. Polym. Sci.: Polym. Phys. Ed. 14, 1717, 1976). In studies by the present inventors, some of the rigid chain and ladder polymers of structures I–XIV, and related polymers, have been found to dissolve in some liquid or molten pure Lewis acids such as SbCl$_3$ and AsF$_3$ but do not dissolve in others such as SbCl$_5$, and SbF$_5$.

Nevertheless, these pure liquid or molten Lewis acids are not practical solvents for potential large-scale processing of the rigid chain thermally stable polymers to films, coatings, or fibers, for obvious technical, environmental, and economic reasons. Thus, the problems of solubilization of rigid chain thermally stable polymers in suitable organic solvents, and consequently, the lack of methods for their ready processing to films, coatings, fibers, and other forms, remain a major obstacle to the commercial uses of these polymers which otherwise have many desired and interesting electronic, optical, thermal stability, and mechanical properties.

SUMMARY OF THE INVENTION

The present invention provides for methods of solution processing of rigid chain and ladder polymers to films, sheets, coatings, fibers, or other useful form from their isotropic or anisotropic (liquid crystalline) solutions in aprotic organic solvents containing Lewis acids. Unlike conventional solution processed polymers the rigid chain and ladder polymers with respect to the present invention are present in solution as polymer complexes, maintained as such during processing, and converted back into their pristine (uncomplexed) state by regeneration or recovery after processing.

Related material pertaining to the details of mediated solubilization by complexation of rigid chain and ladder polymers with Lewis acids in aprotic organic solvents and successful aprotic organic solvents systems for such polymers are disclosed in the referenced applications. In the present invention, the solutions of rigid chain or ladder polymers in aprotic organic solvents containing Lewis acids prepared preferably using these techniques are processed into useful forms such as films, sheets, fibers, and coatings.

Films and sheets are produced by solution casting of the viscous polymer solutions followed by regeneration of the pristine polymer. Fibers of the rigid chain macromolecules are produced by solution spinning either in the dry spinning mode or wet spinning of fibers, precipitation of the extrudite can be combined with regeneration as one step. Coatings of the rigid chain and ladder polymers onto various substrates are produced by conventional spray coating, dip coating, or spin coating depending on both the nature of the substrate and the desired applications of the coatings.

Regeneration of the pristine polymer after solution processing to the desired form is necessary because the rigid chain polymer exists as a complex in solution. Regeneration, or recovery, which is an essential part of the present invention, is achieved by complete decomplexation or precipitation using solvents that exhibit generally high donor properties (e.g. $DN>10$) and dissolve the Lewis acids such as alcohols (methanol, ethanol, etc.), water, or amides (DMF, DMAc, etc).

The methods of solution processing and pristine polymer regeneration of the invention have been used to produce films, coatings, and fibers of many rigid chain or ladder polymers. These include those in illustrated structures I–VIII, XI, XIV, and XIX.

DETAILED EMBODIMENT DESCRIPTION

Figure 1:
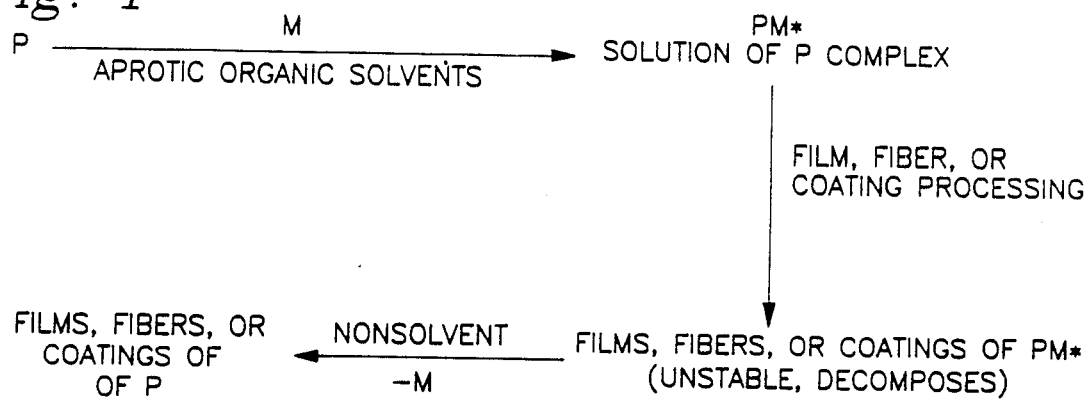
FIG. 1 illustrates the overall process of complexation-mediated solubilization, processing, and regeneration of rigid chain polymers in aprotic organic solvents.

This invention arises from the discovery of the necessary and sufficient chemical treatments of otherwise recalcitrant or difficult to process rigid chain macromolecules that enables ready production of such materials into films, sheets, coatings, fibers, rods, and other forms for various applications using conventional polymer solution processing equipment and machinery. FIG. 1 illustrates the overall scheme of complexation-mediated solubilization and solution processing of rigid chain polymers in aprotic organic solvents and their regeneration after processing.

The related material pertaining to the details of our methods of chemical treatments that allow solubilization of the rigid chain macromolecules of interest in aprotic organic solvents using complexation-mediated polymer dissolution chemistry are disclosed in the above referenced applications. Where necessary details from them are deemed incorporated herein by reference.

With the present invention, the solutions of the rigid chain or ladder polymers in aprotic organic solvents containing Lewis acids prepared preferably using these techniques are processed into useful forms of the pure rigid chain or ladder polymers as films, sheets, coatings, fibers, or rods using conventional polymer solution processing techniques, equipment and machinery. Novel chemical treatments allow regeneration or recovery of the pure polymers from their complexes with Lewis acids in solution.

The need for a means of regeneration of the pristine rigid chain or ladder polymers after solution processing to the desired form, whether film, coating, sheet, fiber, or rod, arises because these polymers exist in solution in aprotic organic solvents, and during processing, as complexes with Lewis acids ($MX_n$). These compounds were solubilized prior to processing by complexation of Lewis acids ($MX_n$) with the rigid chain or ladder structures at specific donor sites such as the unshared electron pairs of heteroatoms (O, S, N) in the polymers or the Pi-electrons of the polymers. A facile means of decomplexation to the pure polymers is thus highly desirable as a part of the processing.

Our detailed studies of the complexation reactions of these rigid chain and ladder polymers with Lewis acids revealed that complexes were formed and solubilized, generally, in aprotic organic solvents characterized by low electron donor numbers ($DN<10$) whereas complexes did not form in solvents of high electron donor numbers ($DN>10$). It has further been revealed these electron donor-acceptor complex formations can be reversed. Decomplexation reactions occur in the presence of relatively high electron donor number ($DN>10$) solvents which compete for the same Lewis acids coordinated to sites on the polymers.

Accordingly, it has been found that facile decomplexation or regeneration of the pure uncomplexed polymers takes place when high electron donor number solvents are contacted with solutions of the complexes or the complexes in the solid state after evaporation of the low electron donor solvents. In fact, virtually any organic solvent or liquid can be used for regeneration or decomplexation, including low electron donor number ($DN<10$) ones provided the respective Lewis acids are soluble in them. Although it is preferable to use high DN ($>10$) solvents such as alcohols (methanol, ethanol, etc.), water, or amides (DMF, DMAc, etc.), even low DN solvents such as nitroalkanes can be used depending on the relative amounts of the solution or polymer complex and the regenerating liquid.

The preferred organic liquids which can be used for decomplexation or regeneration include the following methanol (DN=19.1), methyl acetate (DN=16.5), n-propanol (DN=19.6), iso-propanol (DN~19.6), tetrahydrofuran (DN=20.0), water (DN=16.4), formamide (DN=24), ethanol, ethylenediamine (DN=55), acetone (DN=17), acetonitrile (DN=14.1), NMP (DN=27.3), hexamethylphosphotriamide (DN=38.8), N-methyl-E-caprolactame (DN=27.1), benzonitrile (DN=11.9), n-butylronitrile (DN=16.6), iso-butyronitrile (DN=15.4), N, N-diethylacetamide (DN=27.8), DMF (DN=26.6), DMSO (DN=29.8), ethyl acetate (DN=17.1), ethyl carbonate (DN=16.4) and mixtures thereof. Other organic liquids which can be used for regeneration include p-dioxane, methylene chloride, triethylamine (DN=61.0), pyridine (DN=33.1), and N-methylformamide.

The preferred method of solution processing of the rigid chain or ladder polymers of interest to films or sheets is extrusion of their viscous solutions through a conventional solution casting die, and machinery evaporation of the organic solvent from the solution, followed by regeneration or coagulation in a suitable organic liquid from those listed above. The post extrusion regeneration treatment can also be performed by spraying of the regeneration liquid onto the extruded film or sheet. Complete decomplexation or regeneration is ascertained by any one or a combination of methods. These include comparing the optical, thermal, spectroscopic, elemental/analytical, electrical, dielectric, or morphological properties of the regenerated polymer relative to the pristine (uncomplexed) polymer.

The preferred method of preparing coatings of the rigid chain or ladder polymers of interest is by solution casting, spin coating deposition, dip coating, or spray coating onto the substrate of interest, depending on the application, evaporation of the solvent from the solution. This is followed by regeneration or coagulation in a bath of a suitable liquid from those previously enumerated or by spraying of the decomplexation solvent onto the coating until complete regeneration is achieved. Once again, complete decomplexation is ascertained by the method enumerated above.

Coatings of various rigid chain polymers including BBL, PBT, BBB, and PBO were obtained by these several methods of uniformly applying the solutions onto the substrates of interest. Surfaces of the substrates successfully coated include metallic, glass, ceramic, plastic, and silicon wafer surfaces. The coatings can be removed from the surfaces while still wet to give free standing films.

The preferred method of producing fibers or rods from these rigid chain or ladder polymers is dry or wet fiber spinning of their viscous solutions using conventional spinnerette/die equipments and machinery. In the case of dry spinning, the extruded fiber is dried to evaporate the organic solvent component of the solution and followed by regeneration or coagulation in a suitable liquid from those previously enumerated. In the case of wet spinning, the extrudate fiber is regenerated in a bath of a suitable liquid chosen from those enumerated previously.

Figure 2:
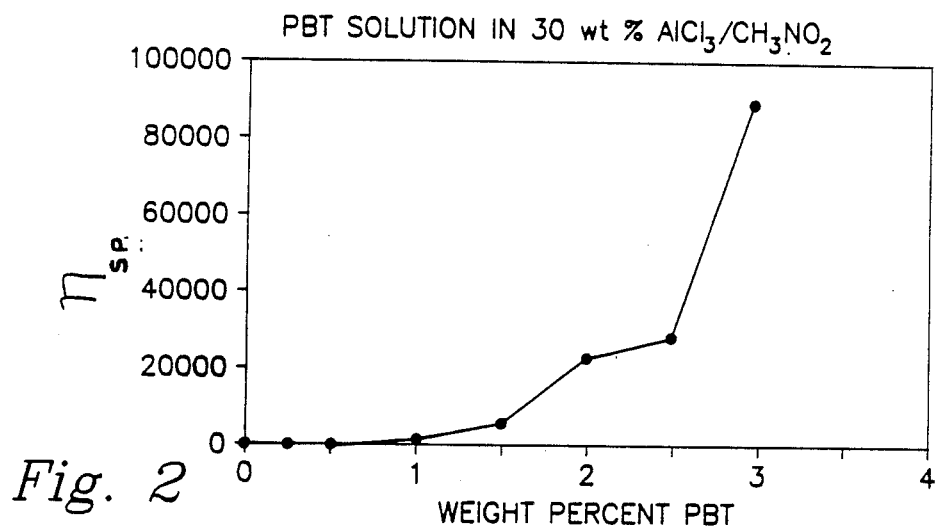
FIG. 2 shows the concentration dependence of the specific viscosity of PBT solutions in organic solvents and illustrates a means for regulating solution viscosity as a processing variable.
Figure 3:
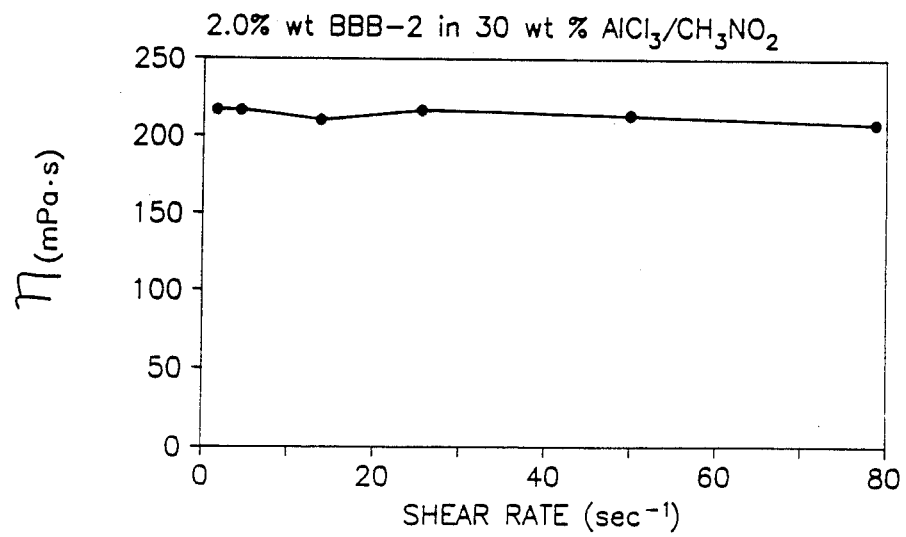
FIG. 3 illustrates the shear rate (1/sec) dependence of the viscosity of a solution of BBB in organic solvents.

FIGS. 2 and 3 show the solution rheological properties of some of the rigid chain polymers in aprotic organic solvents. The specific viscosity ($\eta_{sp}=\eta/\eta_o-1$) of PBT solutions in $AlCl_3$ nitromethane versus polymer concentration in solution is shown in FIG. 2. This result reveals a strong dependence of viscosity on concentration. Thus, one way to regulate the solution viscosity for various processing techniques is via concentration, i.e., amount of polymer solubilized. In the case of isotropic solutions at low polymer concentrations (<3% wt), Newtonian flow behavior was generally observed as shown in the viscosity versus shear rate of FIG. 3. We have also found that the amount and type of Lewis acid ($MX_n$) in solution also regulates the rheological characteristics of the polymer solutions.

For example, the viscosity of polymer solutions containing $AlCl_3$ or $FeCl_3$ was always higher than that of solutions containing $GaCl_3$ at similar concentrations.

The preferred polymer concentration or solution viscosity for a particular solution processing method depends on the rigid chain polymer of interest and applications. The desired solution viscosity and other characteristics can be regulated using technique methods selected from those previously outline. For spray coating the preferred concentration is normally less than 2%wt polymer in solution. For fiber spinning a higher (>2%wt) concentration and hence high viscosity is generally preferred.

Figure 4:
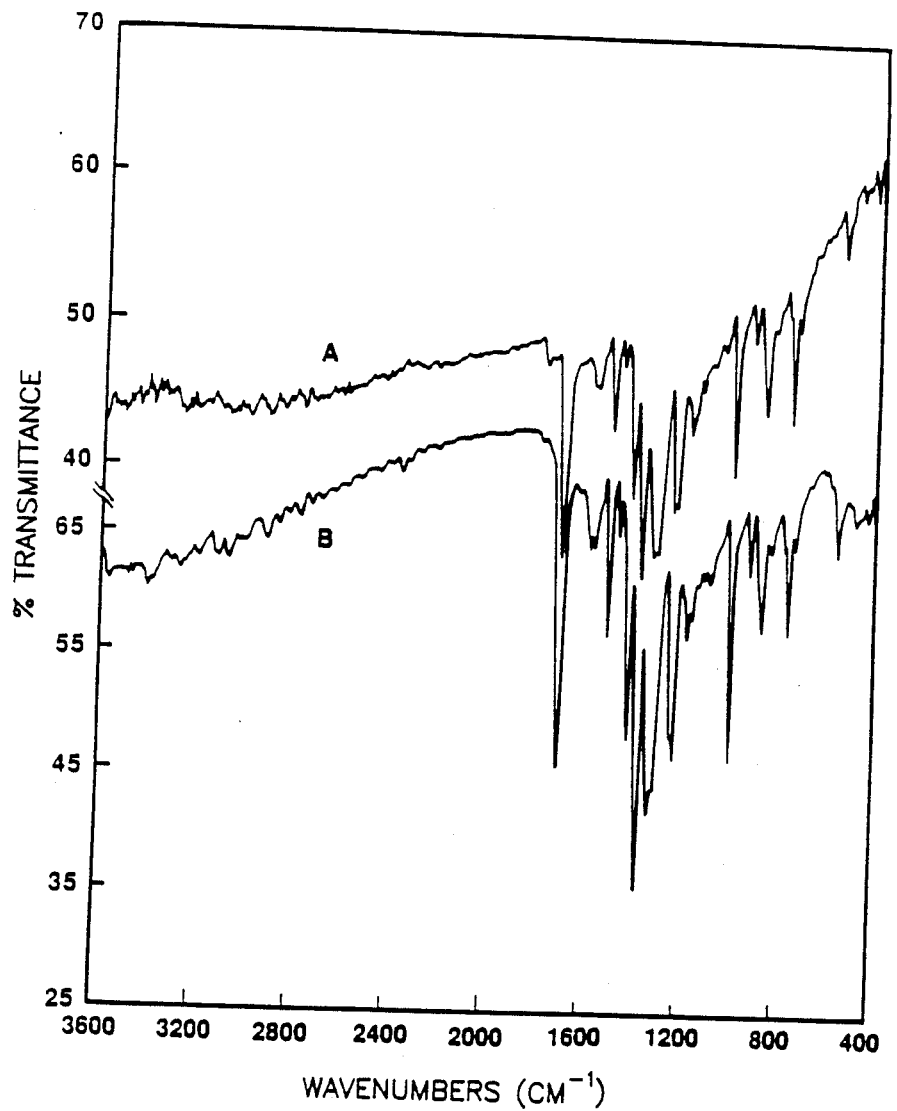
FIG. 4 shows the Fourier Transform Infrared (FTIR) spectra of a pristine (A) and regenerated (B) BBL film from a Lewis acid/organic solvent proving spectroscopic purity of regenerated polymers.

The complete regeneration of the pure polymers from their soluble complexes was investigated by elemental analysis, infrared and UV-Vis-NIR spectroscopies, and thermal analysis, including both thermogravimetric analysis (TGA) and differential scanning calorimetry (DSC). All the results confirmed the recovery of the pure polymers by precipitation of the complexes in non-solvents. The FTIR spectrum of a PBT film prepared from $AlCl_3/CH_3NO_2$ solution was similar to that reported for the model compound and polymer. FIG. 4 shows the similarity of the FTIR spectra of pristine (A) and regenerated BBL film (B) cast from an $FeCl_3$/nitromethane solution using methanol as the nonsolvent or regeneration liquid.

Figure 5:
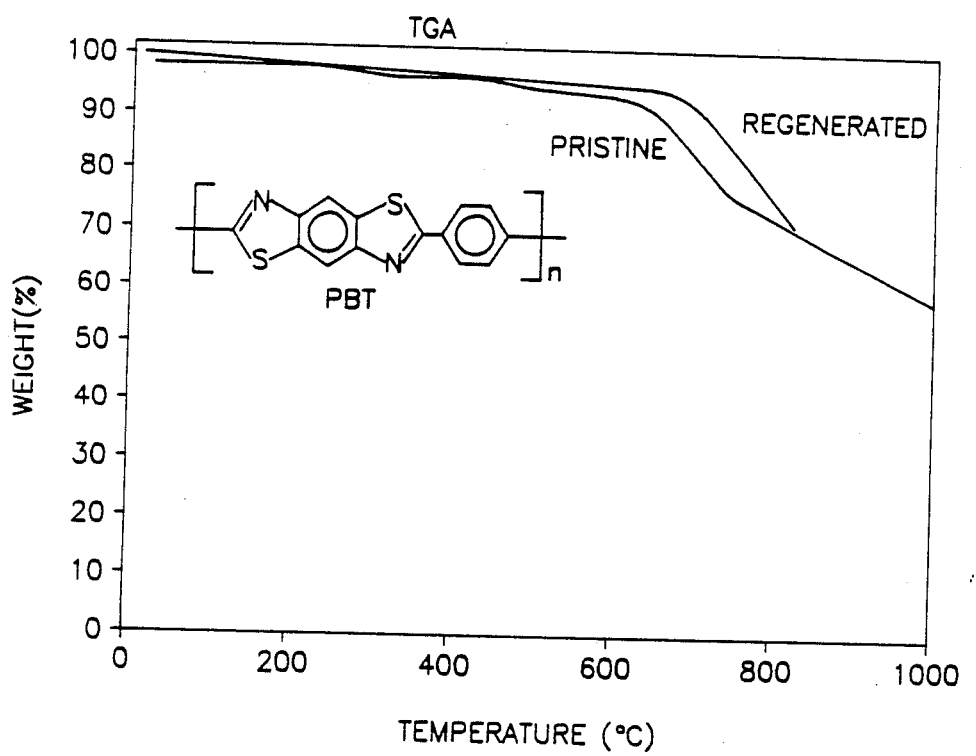
FIG. 5 shows thermoxidative stability of pristine and regenerated PBT proving the purity of polymer regenerated from its complex in solution.

The TGA of both the pristine and regenerated PBT showed similar thermoxidative stability as revealed in FIG. 5. DSC scans of both pristine and regenerated pure PBT were similar, showing no transitions up to 600° C. On the other hand, DSC thermograms of solvent cast $PBT/AlCl_3$ complexes containing varying amount of the Lewis acid always revealed an endothermic transition at ~190-205° C. which is in the range of the melting or decomposition of $AlCl_3$. The TGA weight loss curves of such $PBT/AlCl_3$ complexes similarly revealed a low temperature decomposition product in contrast to FIG. 5.

Without further elaboration, it is believed that one skilled in the art can, using the preceding description, utilize the present invention to its fullest extent. The following specific embodiments are, therefore, to be construed as merely illustrative, and not limitative of the remainder of the disclosure in any way whatsoever. The methods of complexation, processing and recovery of the rigid polymers according to the present invention and their utilization are thus further illustrated by the following examples:

Examples 1–10

In examples 1–10 three each of ten different organic liquid systems were prepared from $FeCl_3$ and the following neat aprotic organic solvents: (1) nitromethane (bp=101° C.), (2) nitroethane (bp=114° C.), (3) 1-nitropropane (bp=131° C.), (4) 2-nitropropane (bp=120°

C.), (5) nitrobenzene (BP=211° C.), (6) $MeNO_2$/Et-$NO_2$ (50/50), (7) $MeNO_2$/$PhNO_2$ (50/50), (8) Et-$NO_2$/$PhNO_2$ (50/50), (9) $MeNO_2$/2-nitropropane (50/50), and (10) $EtNO_2$/1-nitropropane (50/50). Three concentrations of $FeCl_3$, 0.05 Molar, 0.1 M (1.4% wt), and 0.3 M (4.1% wt), in each of the ten neat aprotic organic solvents were prepared in jars at ambient conditions.

Whereas, none of the ten neat aprotic organic liquids would dissolve any of the rigid macromolecules of structures I-XIV, it was found that each of the thirty (30) $FeCl_3$/aprotic organic solvents dissolved at least some of these macromolecules including those of structures IV (BBL), X (DHTAP), XI (BBB), and XII (Cis-BB). The polymer of structure II (PBT) either swelled or was partially soluble. The polymers of structures IX and XIV were notably insoluble in the organic solvents systems of examples 1-10.

Examples 11-20

Both saturated solutions and 0.5 M solutions of $InCl_3$ in the ten neat aprotic organic solvents of examples 1-10 were prepared at ambient conditions. The resulting organic solvent systems constitute examples 11-20 and were found to solubilize DHTAP to give deep blue to blue-green solutions. However, the ladder polymer of structure IX was insoluble in the solvent systems of examples 11-20.

Examples 21-36

In examples 21-36 aluminum chloride ($AlCl_3$) solutions in the ten neat aprotic organic solvents of examples 1-10 as well as in the following neat aprotic solvents were prepared: (31) 1, 2-dichloroethane, (32) benzoyl chloride, (33) thionyl chloride, (34) benzene, (35) toluene, and (36) chlorobenzene. Several concentrations of $AlCl_3$ in these sixteen neat liquids were prepared as in examples 1-10, except that the solutions were prepared in a dry box filled with $N_2$ including 1, 3, 5, 10, 15, 20, 25 and 30% (wt) $AlCl_3$. The resulting solvent systems were found to solubilize many polymers, including the rigid chain macromolecules BBB, BBL, cis-BB, PBT, PBO, polyimides (structure XIV), poly (p-phenylene sulfide) (PPS) (structure XIX), etc. However, $AlCl_3$/p-xylene and $AlCl_3$/1,2-dichloroethane solvent systems only partially dissolved rigid chain macromolecules but the related liquids $AlCl_3$./$MeNO_2$/p-xylene (60/40) and $AlCl_3$/$MeNO_2$/1,2-dicholorethane (60/40) were more effective at solubilizing the polymers.

Example 37

A 3.2 M $AlCl_3$/$MeNO_2$ solvent was prepared under nitrogen in a dry box. Concentrated polymer solutions were prepared, including 6-9% (wt) BBL and 10% (wt) BBB. The 8-9% (wt) BBL solutions in 3.2 M $AlCl_3$./$MeNO_2$ appear to exhibit anisotropic morphology (nematic liquid-crystalline phase) whereas lower concentrations exhibited isotropic morphology. The 10% wt BBB solution in this solvent was isotropic.

Example 38-85

In examples 38-85 solvent systems were prepared from $SbCl_3$, $SbCl_5$, and $SbF_5$ and the sixteen neat aprotic organic solvents of examples 21-36 and following the procedures of examples 21-36. The concentration of the Lewis acids was in the range 2-28.9% (wt). The resulting solvent systems at room temperature were found to be effective for dissolving many polymers, including most of the rigid chain macromolecules of structures I to XIV and XIX. However, $SbCl_5$/benzene, $SbCl_5$/toluene, $SbCl_5$/chlorobenzene, and $SbCl_5$/p-xylene solvent systems could not solubilize BBB, PBT, BBL, and aromatic polyimides even at Lewis acid concentrations as high as 25-32% wt. Warming the solvent systems to 60° C. significantly improved the number and amount of polymer solubilized and the dissolution rate.

Examples 86-185

In examples 86-185 the Lewis acids $AlBr_3$, $AlI_3$, $GaCl_3$, $GaBr_3$, $GaI_3$, $TiCl_4$, $SnCl_4$, $MoCl_6$, $TaCl_5$, and $BCl_3$ were used to prepare organic solvent systems at various concentrations from 1% wt up to saturation or limits of miscibility in the, ten neat aprotic organic solvents in examples 1-10. The resulting solvent systems were found to be effective at solubilizing many polymers, including most of the rigid chain macromolecules of structures I to XIV and XIX.

Examples 186-197

The rigid chain polymer solutions of examples 21-30, including the solutions of BBB, BBL, PBT, PBO, polyimides (XIX), poly (p-phenylene sulfide) (PPS) (XIX), were processed by solution casting onto various substrates including glass, silicon wafers, metals, and plastics. The aprotic organic solvents were evaporated by air drying or heating on a hot plate. Decomplexation or regeneration was done by immersing the deposited films and substrates in a bath of (186) methanol, (187) ethanol, (188) iso-propane alcohol, (189) n-butane alcohol, (190) methyl acetate, (191) ethyl acetate, (192) NMP, (193) DMF, (194) water, (195) acetone, (196) DMAc, or (197) DMSO. The pure rigid chain polymers were recovered as films on the substrates. Free standing films were obtained when the decomplexed polymer films were peeled off the substrates while still wet. In parallel series of experiments recovery or decomplexation was accomplished by spraying the recovery solvents onto the coatings.

Examples 198-209

The polymer solutions of examples 1-10 were processed into films and coatings using the decomplexation methods of examples 186-197.

Examples 210-221

The polymer solutions of examples 1-10, 21-30, and 198-209 were extruded into free standing films followed by regeneration using the methods of examples 186-197.

Examples 222-225

The solutions of BBB, BBL, and PBT prepared in $AlCl_3$/$CH_3NO_2$ or $FeCl_3$/$CH_3NO_2$ as in examples 1-10 were spray coated using solutions of low polymer concentration (<2%wt) and an air spray gun. The coatings on metallic, plastic, ceramic, glass or silicon substrates were decomplexed using (222) methanol, (223) water, (224) ethanol and (225) isopropanol respectively. Decomplexation was either by immersion of the coatings/substrates in a bath of the regenerating liquid or by spraying of the liquid. Very smooth, mirror-like coatings were obtained.

Examples 226-229

Various solutions of PBT, BBB, and BBL were extruded through a die under pressure to give fibers after recovery according to the methods of examples 222-225.

Examples 230-233

The isotropic solutions of the polymers of examples 226-229 were spin coated onto glass and silicon wafers. They produced uniform thin films after decomplexation according to the methods of examples 222-225.

Examples 234-237

Dilute solutions of BBL (<2%) in $AlCl_3/CH_3NO_2$ and $FeCl_3/CH_3NO_2$ were spray coated onto four printed circuit (PC) boards followed by decomplexation using the four nonsolvents of examples 222-225. The regeneration was performed by spraying of the nonsolvents. Excellent continuous films over the irregular PC board surfaces were obtained.

Properties of Lewis Acid/Organic Solvent Systems

The solvation power of any solvent is a complicated quantity which depends on various factors such as structure, polarity, basicity, acidity, donor number (DN), and acceptor number (AN) of the solvent as well as on similar properties of the substrate to be solubilized. Of the classical solvent parameters such as dipole moment, polarizability, dielectric constant ($\epsilon'$), and solubility parameter ($\delta$), $\delta$ values have been widely used to predict solubility of a given polymer in a given solvent. Unfortunately, the solubility parameter of organic solvents does not correctly predict solubility of rigid chain macromolecules such as in structures I-XIV. Contrary to what might be predicted based on solubility parameter values for organic solvents and the rigid chain polymers, the polymers were insoluble. For example, the calculated solubility parameter of PBT is about 12.8 which predicts that it should be soluble in ethanol or nitromethane as both have a solubility parameter of 12.7. However, PBT is insoluble in both of these solvents. The strong protonic acids such as concentrated sulfuric acid, methanesulfonic acid, and trifluoromethanesulfonic acid which heretofore generally dissolved the rigid chain macromolecules have a very high acceptor number (AN > 100) and solubilize via protonation of the rigid macromolecules.

The present solvent systems based on aprotic organic solvents containing Lewis acids provide a novel general mechanism of solubilization of rigid chain thermally stable polymers. The solvation properties of an organic solvent, including its donor and acceptor numbers (DN, AN), are radically changed by the addition of Lewis acids. For example, in Table 1 it is seen that the acceptor number of neat 1,2-dichloroethane (DCE) is increased about six-fold to 100 due to the addition of $SbCl_5$. Thus, by adding metal halide Lewis acids to organic solvents, organic liquids with as powerful the solvation properties as concentrated protonic acids can be obtained without the previously enumerated drawbacks of the latter.

The boiling point (bp) of the present Lewis acid/aprotic organic solvents is practically the same as the value for the neat aprotic organic solvents. This fact is important and advantageous in the application of the solvents for solution processing to films, coatings, and fibers of the relevant polymers solubilized in the solvents.

The amount of polymer solubilized in the aprotic organic solvents containing Lewis acids increase with increasing amounts of the Lewis acids in solution. For example, up to 9% wt of BBL solutions in 3 M $AlCl_3/R-NO_2$ ($MeNO_2$, $EtNO_2$, etc.) have been prepared. This is about twice the highest possible concentration of the same BBL in methanesulfonic acid solutions that can be prepared.

TABLE 1

| | Properties of Some Solvents | | | |
|---|---|---|---|---|
| Solvent | b.p.(°C.)* | $\epsilon'$* | donor number+ (DN) | acceptor number+ (AN) |
| 1. Nitromethane (NM) | 101 | 35.7 | 2.7 | 20.5 |
| 2. Nitroethane (NE) | 114 | 28.06 | — | — |
| 3. 1-Nitropropane (1-NP) | 131 | 23.24 | — | — |
| 4. 2-Nitropropane (2-NP) | 120 | 25.5 | — | — |
| 5. Nitrobenzene (NB) | 211 | 34.82 | 4.4 | 14.8 |
| 6. N,N-Dimethylformamide (DMF) | 153 | 36.7 | 26.6 | 16.0 |
| 7. N,N-Dimethylacetamide (DMAc) | 166 | 37.78 | 27.8 | 13.6 |
| 8. N-methyl-2-pyrrolidone (NMP) | 202 | 32.0 | 27.3 | 13.3 |
| 9. Acetonitrile (MeCN) | 81.6 | 37.5 | 14.1 | 18.9 |
| 10. N,N-Dimethylsulfoxide (DMSO) | 189 | 46.68 | 29.8 | 19.3 |
| 11. Methanol (MeOH) | 65 | 32.63 | 19.1 | 41.5 |
| 12. Acetone | 56 | 21.6 | 17.0 | 12.5 |
| 13. Water | 100 | 78 | 16.4 | 54.8 |
| 14. Acetic acid | 118 | 6.15 | — | 52.9 |
| 15. 1,2-Dichloroethane (DCE) | 83.5 | 10.36 | 0.0 | 16.7 |
| 16. $SbCl_5$/DCE | — | — | — | 100.0 |
| 17. Sulfuric acid | — | — | — | |
| 18. Methanesulfonic acid (MSA) | — | — | — | 126.1 |
| 19. Trifluoroacetic acid | 71.78 | 8.55 | — | 105.3 |
| 20. Trifluoromethanesulfonic acid | 161 | — | — | 131.7 |

*J. A. Riddick and W. B. Bunger, Techniques of Organic Chemistry, vol. 2, Organic Solvents, 3rd ed., Wiley-Interscience, New York, 1970.
+V. Gutmann, The Donor-Acceptor Approach to Molecular Interactions, Plenum Press, New York, 1978.

What is claimed is:

1. A method of regenerating pristine macromolecular polymer compounds, of a class normally insoluble in aprotic organic solvents from solubilized electron acceptor mediating agent complexes thereof in an aprotic organic solvent system comprising the step of decomplexation of the mediating agent with respect to the macromolecular polymer.

2. The method of claim 1 wherein said mediating agent comprises a Lewis acid and wherein said decomplexation comprises treating said complexed macromolecular polymer with second aprotic organic solvent in which the Lewis acid is soluble.

3. The method of claim 1 wherein said decomplexation comprises treating said complexed macromolecular polymer with an electron donor compound which preferentially complexes with said mediating agent with respect to the macromolecular polymer.

4. The method of claim 3 wherein said electron donor compound is a second aprotic organic solvent system containing at least one aprotic organic solvent of relatively high electron donor properties.

5. The method of claim 4 wherein said mediating agent is a Lewis Acid and wherein said first aprotic organic solvent system includes at least one solvent having a donor number (DN<10) and said second aprotic solvent includes at least one solvent having DN>10.

6. The method of claim 4 wherein said second aprotic solvent system contains at least one compound selected from the group consisting of methanol, methyl acetate, n-propanol, iso-propanol, tetrahydrofuran, water, formamide, ethanol, ethylenediamine, acetone, acetronitrile, NMP, hexamethylphosphotriamide, N-methyl-E-caprolactame, benzoitrile, n-butylronitrile, iso-butyronitrile, N, N-diethylacetamide, DMF, DMSO, ethyl acetate, ethyl carbonate and mixtures thereof.

7. The method of claim 1 wherein said first aprotic organic solvent system is removed prior to decomplexation treatment.

8. The method of claim 2 wherein said first aprotic organic solvent system is removed prior to treatment with said second aprotic organic solvents system.

9. The method of claim 3 wherein said first aprotic organic solvent system is removed prior to decomplexation treatment.

10. The method of claim 5 wherein said first aprotic organic solvent system is removed prior to treatment with said second aprotic organic solvent system.

11. The method of claim 6 wherein said first aprotic organic solvent system is removed prior to treatment with said second aprotic organic solvent system.

12. A method of recovering pristine macromolecular polymer compounds of a class normally insoluble in aprotic organic solvents from complexes thereof with a mediating agent solubilized in a first aprotic solvent wherein said mediating agent is an amount of at least one Lewis acid selected from the class consisting of $AlCl_3$, $FeCl_3$, $GaCl_3$, $SbCl_3$, $InCl_3$, $SbCl_5$, $AsF_3$ and $SbF_5$; and wherein said first aprotic organic solvent system is an amount of one or more aprotic organic solvents selected from the group consisting of nitroalkanes or nitroalkenes having from 1 to 6 atoms, nitrobenzene, 1,2-dichloroethane, benzene, toluene, xylenes, and chlorobenzene comprising the step of:
recovering the pristine polymer form by treating said macromolecular polymer in the complexed state with a second aprotic solvent system of the group consisting of methanol, methyl acetate, n-propanol, iso-propanol, tetrahydrofuran, water, formamide, ethanol, ethylenediamine, acetone, acetronitrile, NMP, hexamethylphosphotriamide, N-methyl-E-caprolactame, benzoitrile, n-butylronitrile, iso-butyronitrile, N, N-diethylacetamide, DMF, DMSO, ethyl acetate, ethyl carbonate and mixtures thereof.

13. The method of claim 12 wherein said first aprotic organic solvent system is removed prior to treatment with said second aprotic organic solvent system.

14. A method of solution processing organic macromolecular polymer compounds from a class of polymers normally insoluble in aprotic organic solvents comprising the steps of:
solution processing said normally insoluble polymer compounds as solution complexes of compatible electron acceptor mediating agents and a first aprotic organic solvent system to the physical form desired; and
recovering the pristine polymer from the complexed state in the processed physical form by reversing the complexation of said mediating agents.

15. The method of claim 14 wherein said pristine polymer structure is recovered by treating said complexed macromolecular polymer compounds with an electron donor compound which complexes with said electron acceptor mediating agent in preference to said macromolecular polymer.

16. The method of claim 15 wherein said electron donor compound is a second aprotic organic solvent system containing at least one aprotic organic solvent of relatively high donor properties.

17. The method of claim 16 wherein said solution processing comprises extrusion from a viscous solution into rod sheet or film form and wherein said method further comprises the step of removing said first organic aprotic solvent system prior to treatment with said second aprotic organic solvent system.

18. The method of claim 16 wherein said solution processing comprises solution casting of the viscous solution to produce sheets or films.

19. The method of claim 18 further comprising the step of removing the first solvent system prior to treatment with said second solvent system.

20. The method of claim 16 wherein the solution processing mode is one selected from a group consisting of spray coating on a substrate material, spin coating on a substrate material, solution coating, solution coating on a substrate material and dip coating on a suitable substrate material and wherein said steps are carried out sequentially.

21. The method of claim 20 further comprising the step of removing the first solvent system prior to treatment with said second solvent system.

22. The method of claim 21 further comprising the step of removing the coating from the substrate to yield a free-standing film.

23. The method of claim 16 wherein the physical processing mode is one selected from a group consisting of dry and wet solution extrusion to film, sheets, and dry and wet fiber spinning from viscous solution and wherein said steps occur substantially simultaneously.

24. The method of claim 14 further comprising the step of controlling the rheological characteristics of said solution complexes by controlling the concentration of the solubilized compound of interest in said first aprotic solvent system.

25. The method of claim 16 wherein said mediating agents are Lewis acids and further comprising the step of controlling the rheological characteristics of the solution by selection of said mediating agent.

26. A method of solution processing rigid chain and ladder polymers of the class having electron donor sites occurring at least once in each repeating polymer unit and which are substantially insoluble in aprotic organic solvents further selected as one or more of the group consisting of:

poly (p-phenylene-2,6-benzoxazole) (PBO), poly (p-phenylene-2,6-benzothiazole) (PBT), poly (p-phenylene-2,6-benzimidazole) (PBI), (BBL), (BBL-N), (BBL-P), (BBL-DBF), (BBL-AQ), (BBB), and (PPS), comprising the steps of:

solution processing said polymers as solution complexes of compatible electron acceptor mediating agents selected from the Lewis acid class of metallic halides consisting of an amount of at least one Lewis acid selected from the class consisting of $AlCl_3$, $FeCl_3$, $GaCl_3$, $SbCl_3$, $InCl_3$, $SbCl_5$, $AsF_3$ and $SbF_5$; in a first aprotic organic solvent system containing an amount of one or more aprotic organic solvents selected from the group consisting of nitroalkanes or nitroalkenes having from 1 to 6 atoms, nitrobenzene, 1,2-dichlcoroethane, benzene, toluene, xylenes, and chlorobenzene;

recovering the pristine polymer form by treating said compound of interest in the complexed state with a second aprotic solvent system containing at least one compound selected from the group consisting of methanol, methyl acetate, n-propanol, isopropanol, tetrahydrofuran, water, formamide, ethanol, ethylenediamine, acetone, acetonitrile, NMP, hexamethylphosphotriamide, N-methyl-E-caprolactame, benzoitrile, n-butylronitrile, isobutyronitrile, N, N-diethylacetamide, DMF, DMSO, ethyl acetate, and ethyl carbonate.

* * * * *